(12) United States Patent
Filsfils et al.

(10) Patent No.: US 12,137,093 B2
(45) Date of Patent: Nov. 5, 2024

(54) SYSTEMS AND METHODS FOR APPLYING ATTESTATION TOKENS TO LISP MESSAGES

(71) Applicant: Cisco Technology, Inc., San Jose, CA (US)

(72) Inventors: Clarence Filsfils, Brussels (BE); Marc Portoles Comeras, Mountain View, CA (US); David Delano Ward, Somerset, WI (US); Alberto Rodriguez Natal, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 47 days.

(21) Appl. No.: 17/814,410

(22) Filed: Jul. 22, 2022

(65) Prior Publication Data

US 2022/0360577 A1   Nov. 10, 2022

Related U.S. Application Data

(63) Continuation of application No. 16/574,771, filed on Sep. 18, 2019, now Pat. No. 11,411,948.

(60) Provisional application No. 62/829,568, filed on Apr. 4, 2019.

(51) Int. Cl.
*H04L 9/40* (2022.01)

(52) U.S. Cl.
CPC ............ *H04L 63/083* (2013.01); *H04L 63/20* (2013.01)

(58) Field of Classification Search
CPC ............................ H04L 63/083; H04L 63/20
See application file for complete search history.

(56) References Cited

U.S. PATENT DOCUMENTS

| 7,751,405 B1 | 7/2010 | Kompella |
| 7,920,558 B2 | 4/2011 | He |
| 8,155,000 B2 | 4/2012 | Vasseur |

(Continued)

FOREIGN PATENT DOCUMENTS

| CN | 101834793 A | 9/2010 |
| CN | 105591811 | 5/2016 |

(Continued)

OTHER PUBLICATIONS

Fuchs, A. et al., "Time-Based Uni-Directional Attestation," https://tools.ietf.org/html/draft-birkholz-rats-tuda-00, dated Mar. 12, 2019, 68 pages.

(Continued)

*Primary Examiner* — Meng Li
*Assistant Examiner* — Shu Chun Gao
(74) *Attorney, Agent, or Firm* — Baker Botts L.L.P.

(57) ABSTRACT

In one embodiment, an apparatus of a LISP environment includes one or more processors and computer-readable non-transitory storage media coupled to the one or more processors. The computer-readable non-transitory storage media include instructions that, when executed by the one or more processors, cause the one or more processors to perform operations including receiving an attestation token from a first component of the LISP environment. The operations also include encoding the attestation token using a LISP message format. The operations further include distributing the encoded attestation token with a LISP signaling message to a third component of the LISP environment.

20 Claims, 8 Drawing Sheets

(56) References Cited

U.S. PATENT DOCUMENTS

| | | |
|---|---|---|
| 9,161,227 B1 | 10/2015 | Bye et al. |
| 9,455,992 B2 | 9/2016 | Douceur et al. |
| 9,654,503 B1 | 5/2017 | Kowalyshyn |
| 9,762,583 B2 | 9/2017 | Guccione et al. |
| 10,015,132 B1* | 7/2018 | Qin .................... H04L 61/2567 |
| 10,211,977 B1 | 2/2019 | Roth et al. |
| 10,298,488 B1 | 5/2019 | Wood et al. |
| 10,594,592 B1 | 3/2020 | Wang |
| 10,652,266 B1 | 5/2020 | Tautschnig et al. |
| 10,735,197 B2 | 8/2020 | Sundaresan et al. |
| 10,769,635 B2 | 9/2020 | Lindemann |
| 2002/0012359 A1 | 1/2002 | Kikuchi et al. |
| 2003/0120948 A1 | 6/2003 | Schmidt et al. |
| 2005/0047412 A1 | 3/2005 | Hares |
| 2005/0213768 A1 | 9/2005 | Durham et al. |
| 2007/0008882 A1 | 1/2007 | Oran |
| 2007/0028098 A1 | 2/2007 | Baartman et al. |
| 2007/0076599 A1 | 4/2007 | Ayyagari et al. |
| 2007/0133406 A1 | 6/2007 | Vasseur |
| 2007/0180495 A1 | 8/2007 | Hardjono et al. |
| 2007/0192484 A1 | 8/2007 | Yamaoka et al. |
| 2008/0101239 A1 | 5/2008 | Goode |
| 2008/0170493 A1 | 7/2008 | Vasseur |
| 2008/0225708 A1 | 9/2008 | Lange |
| 2009/0086977 A1 | 4/2009 | Berggren |
| 2009/0300707 A1 | 12/2009 | Garimella et al. |
| 2012/0265984 A1 | 10/2012 | Ramanujan |
| 2013/0239169 A1 | 9/2013 | Nakhjiri |
| 2013/0345530 A1 | 12/2013 | McRoberts et al. |
| 2014/0029418 A1 | 1/2014 | Jain et al. |
| 2014/0115325 A1 | 4/2014 | Detienne et al. |
| 2015/0089568 A1 | 3/2015 | Sprague et al. |
| 2015/0128223 A1 | 5/2015 | Magri et al. |
| 2015/0249591 A1 | 9/2015 | Alvarez et al. |
| 2015/0341428 A1 | 11/2015 | Chauhan |
| 2015/0372901 A1 | 12/2015 | Pacella |
| 2016/0072708 A1 | 3/2016 | Field |
| 2016/0080502 A1 | 3/2016 | Yadav et al. |
| 2016/0119821 A1 | 4/2016 | Ramachandran et al. |
| 2016/0315819 A1 | 10/2016 | Dara et al. |
| 2016/0323184 A1* | 11/2016 | Li .......................... H04L 45/02 |
| 2017/0026417 A1* | 1/2017 | Ermagan ............. H04L 63/0428 |
| 2017/0302459 A1 | 10/2017 | Fenner et al. |
| 2017/0353430 A1 | 12/2017 | Holtmanns et al. |
| 2018/0041420 A1 | 2/2018 | Saad et al. |
| 2018/0109450 A1 | 4/2018 | Filsfils et al. |
| 2018/0324090 A1 | 11/2018 | Duncan et al. |
| 2018/0367321 A1 | 12/2018 | Stammers et al. |
| 2018/0367449 A1 | 12/2018 | Pani et al. |
| 2019/0041829 A1 | 2/2019 | Sinha et al. |
| 2019/0052705 A1 | 2/2019 | Giffin et al. |
| 2019/0058709 A1 | 2/2019 | Kempf et al. |
| 2019/0098676 A1 | 3/2019 | Svennebring |
| 2019/0116038 A1 | 4/2019 | Sprague |
| 2019/0123999 A1 | 4/2019 | Chunduri et al. |
| 2019/0140850 A1 | 5/2019 | Ambrosin et al. |
| 2019/0173750 A1 | 6/2019 | Shaikh et al. |
| 2020/0084132 A1* | 3/2020 | Chauhan ................. H04L 43/14 |
| 2020/0084202 A1 | 3/2020 | Smith et al. |
| 2020/0153627 A1 | 5/2020 | Wentz |
| 2020/0160320 A1 | 5/2020 | Williams et al. |
| 2020/0287888 A1 | 9/2020 | Moore et al. |
| 2020/0296025 A1 | 9/2020 | Wang |
| 2020/0322312 A1 | 10/2020 | Psenak et al. |
| 2021/0083973 A1 | 3/2021 | Peng et al. |
| 2021/0160056 A1 | 5/2021 | Yan |
| 2021/0297406 A1 | 9/2021 | Landers et al. |
| 2021/0377173 A1 | 12/2021 | Zhang et al. |

FOREIGN PATENT DOCUMENTS

| | | | |
|---|---|---|---|
| CN | 107204941 A | 9/2017 | |
| CN | 105591811 B * | 8/2019 | ......... H04L 41/0672 |
| CN | 110650075 | 1/2020 | |
| DE | 60109809 T2 | 3/2006 | |
| EP | 1732268 A1 | 12/2006 | |
| EP | 2698961 B1 | 12/2014 | |
| JP | 2004228817 A | 8/2004 | |
| JP | 2004260567 A | 9/2004 | |
| JP | 2015173378 A | 10/2015 | |
| WO | 2011103781 | 9/2011 | |
| WO | WO-2011103781 A2 * | 9/2011 | ............ H04L 45/50 |
| WO | 2012028409 A1 | 3/2012 | |

OTHER PUBLICATIONS

Farinacci, D. et al., LISP Canonical Address Format (LCAF), https://tools.ietf.org/html/rfc8060, dated Feb. 2017, 36 pages.

Fuller, V. et al., "Locator/ID Seperation Protocol (LISP) Control-Plane," https://tools.ietf.org/html/draft-ietf-lisp-rfc6833bis-24, dated Feb. 4, 2019, 62 pages.

Maino, F. et al., "LISP-Security (LISP-SEC)," https://tools.ietf.org/html/draft-ietf-lisp-sec-17, dated Nov. 29, 2019, 23 pages.

Farinacci, D. et al., "LISP Data-Plane Confidentiality," https://tools.ietf.org/html/draft-ietf-lisp-crypto-10, Oct. 14, 2016, 21 pages.

Adnan A., et al., "A Trust Aware Routing Protocol for Energy Constrained Wireless Sensor Network," Telecommunication Systems, Baltzer Science Publishers, Basel, CH, Jun. 10, 2015, vol. 61, No. 1, pp. 123-140, DOI: 10.1007/s11235-015-0068-8, ISSN 1018-4864, XP035595336.

Andersson L., et al., "LDF Specification," Network Working Group, Oct. 2007, 135 Pages.

APNIC: "SDN Workshop", WSDN01_v0.1., Downloaded Sep. 26, 2019, 93 Pages, Retrieved from URL: https://wiki.apnictraining.net/_media/apnic46-sdn/wsdn01_-_module_4_-_bgp-ls_-_v1.0.pdf.

Awduche D.O., et al., "RSVP-TE: Extensions to RSVP for LSP Tunnels," Network Working Group, Request for Comments 3209, Dec. 2001, pp. 1-61.

Baker F., et al., "RSVP Cryptographic Authentication," RFC 2747, Jan. 2000, 21 Pages.

Bashandy A., et al., "Segment Routing with the MPLS Data Plane," RFC 8660, Dec. 6, 2019, The Internet Society, Reston, VA, USA, 29 pages.

Berger L., et al., "RSVP Extensions for IPSEC Data Flows," RFC2207, Sep. 1997, 14 Pages.

"Border Gateway Protocol Link-State," Downloaded Sep. 26, 2019, 12 Pages, Retrieved from URL: https://www.cisco.com/c/en/Id/doc/ios-xml/ios/iproute_bgp/configuration/xe-16/irg-xe-16-book/bgp-ls.pdf.

Braden R., et al., "Resource Reservation Protocol (RSVP)—Version 1 Functional Specification," RFC 2205, The Internet Society, Reston, VA, USA, Sep. 1997, pp. 1-112.

Butler K., et al., "A Survey of BGP Security Issues and Solutions," Proceedings of the IEEE Transactions on Networking, Jan. 2010, vol. 98, No. 1, 4 Pages.

Camtepe S.A., et al., "Kerberos Based Security System for Session Initiation Protocol," 1996, 150 Pages.

Clad F., Ed., et al., "Service Programming with Segment Routing, draft-ietf-spring-sr-service-programming-01," Nov. 4, 2019, 32 Pages.

Clad F., et al., "Service Programming with Segment Routing, draft-xuclad-spring-sr-service-programming-00," Jul. 2, 2018, 30 Pages.

Deering S., et al., "Internet Protocol, Version 6 (IPv6) Specification," RFC 8200, Jul. 2017, The Internet Society, Reston, VA, USA, 42 pages.

Durand J., et al., "BGP Operations and Security, rfc7454.txt," Internet Engineering Task Force (IETF), Standard, Internet Society (ISOC) 4, Rue Des Falaises CH-1205 Geneva, Switzerland, Feb. 18, 2015, pp. 1-26, XP015104552.

Gao B., "Implementation and Validation of the General Internet Signaling Transport Protocol," Apr. 2008, 117 Pages.

Gredler H., Ed., et al., "North-Bound Distribution of Link-State and Traffic Engineering (TE) Information Using BGP," Internet Engineering Task Force (IETF), Mar. 2016, 49 Pages, [Retrieved on Sep. 26, 2019], Retrieved from URL: https://tools.ietf.org/html/rfc7752.

(56) References Cited

OTHER PUBLICATIONS

Ham M.J., "BGP Route Attestation: Design and Observation Using IPV6," Dakota State University, Beadle Scholar, Masters Theses Doctoral Dissertations, Spring, Mar. 1, 2017, 161 Pages.

International Preliminary Report on Patentability for International Application No. PCT/US2020/026358, mailed Oct. 14, 2021, 08 Pages.

International Preliminary Report on Patentability for International Application No. PCT/US2020/026375, mailed Oct. 14, 2021, 08 Pages.

International Preliminary Report on Patentability for International Application No. PCT/US2020/026385, mailed Oct. 14, 2021,14 Pages.

International Preliminary Report on Patentability for International Application No. PCT/US2020/026499, mailed Oct. 14, 2021, 08 Pages.

International Preliminary Report on Patentability for International Application No. PCT/US2020/026507, mailed Oct. 14, 2021, 09 Pages.

International Search Report and Written Opinion for International Application No. PCT/US2020/026358, mailed Jul. 21, 2020, 08 Pages.

International Search Report and Written Opinion for International Application No. PCT/US2020/026375, mailed Jul. 23, 2020, 09 Pages.

International Search Report and Written Opinion for International Application No. PCT/US2020/026499, mailed Jul. 21, 2020, 13 Pages.

International Search Report and Written Opinion for International Application No. PCT/US2020/026507, mailed Jul. 21, 2020, 11 Pages.

IP Routing: BGP Configuration Guide, Updated on Feb. 13, 2017, 13 Pages, [Retrieved on Sep. 26, 2019], Retrieved from URL: https://www.cisco.com/c/en/us/td/docs/ios-xml/ios/iproute_bgp/configuration/xe-16/irg-xe-16- book/irg-xe-16-book_chapter_01010101 .html, 2019.

Katz D., et al., "Bidirectional Forwarding Detection (BFD)", Internet Engineering Task Force (IETF), Jun. 2010, pp. 1-49.

Kent S., et al., "Threat Model for BGP Path Security," Internet Engineering Task Force (IETF), RFC: 7132, Standard, Internet Society (ISOC) 4, Rue Des Falaises CH-1205 Geneva, Switzerland, Feb. 22, 2014, pp. 1-20, XP015100576.

Kent S.T., "Securing the Border Gateway Protocol," The Internet Protocol Journal, Sep. 2003, 44 Pages.

Kim P., "Resource Reservation in Shared and Switched Demand Priority Local Area Networks," Sep. 1998, 24 pages.

Lepinski M., et al., "An Infrastructure to Support Secure Internet Routing, draft-ietf-sidr-arch-11.txt," Internet Engineering Task Force(IETF), Standard Working Draft, Internet Society (ISOC) 4, Rue Des Falaises CH-1205 Geneva, Switzerland, Sep. 21, 2010, No. 11, pp. 1-25, XP015071244.

Li Q., et al., "Enhancing the Trust of Internet Routing with Lightweight Route Attestation," IEEE Transactions on Information Forensics and Security, Piscataway, NJ, US, Apr. 1, 2012, vol. 7, No. 2, pp. 691-703, DOI: 10.1109/TIFS.2011.2177822, ISSN 1556-6013, XP011433682.

Mankin A., Ed., et al., "Resource Reservation Protocol (RSVP)—Version 1 Applicability Statement Some Guidelines on Deployment," RFC 2208, Sep. 1997, 19 Pages.

Mota R., "Segment Routing," ACG Research Paper, 2018, 28 Pages.

Partial Search Report for International Application No. PCT/US2020/02635, mailed Jul. 16, 2020, 15 Pages.

Patent Cooperation Treaty, International Search Report and Written Opinion for International Application No. PCT/US2020/026385, mailed Sep. 7, 2020, 22 Pages.

Rosen E., etal, "MPLS Label Stack Encoding," Network Working Group, RFC 3032, Jan. 2001, pp. 1-23.

Sagara K., et al., "A Distributed Authentication Platform Architecture for Peer-to-peer Applications," IEICE Transactions on Communications, Communications Society, Tokyo, JP, Mar. 1, 2005, vol. E88-B, No. 3, pp. 865-872, DOI:10.1093/ietcom/e88-b.3.865, ISSN 0916-8516, XP001225562.

Shoneman D.T, et al., "Endpoint Trust-based Traffic Management," IP.COM, IP.COM Incorporated, Oct. 31, 2017, 13 Pages, West Henrietta, NY, US, ISSN 1533-0001, XP013176242.

Singh D., "Yet Another New BGP NLR1: BGP-LS," Downloaded on Sep. 26, 2019, 20 Pages, Retrieved from URL: https://packetpushers.net/yet-another-new-bgp-nlri-bgp-ls/, Packet Pushers, 2015.

TCG Public Review: "TCG Guidance for Securing Network Equipment Using TCG Technology," Version 1.0, Revision 29, Jan. 17, 2018, 58 pages.

Trusted Computing Group: "TCG Guidance for Securing Network Equipment," Jan. 17, 2018, 2 Pages, Retrieved from URL: https://trustedcomputinggroup.org/resource/tcg-guidance-securing-network-equipment/.

Wang B., et al., "A light-weight trust-based QoS Routing Algorithm for Ad Hoc Networks," Pervasive and Mobile Computing, NL, Jun. 26, 2013, vol. 13, pp. 164-180, DOI: 10.1016/j.pmcj.2013.06.004, ISSN 1574-1192, XP055712411.

Wei Y., et al., "Analysis of Resource Reservation Protocol-Traffic Engineering (RSVP-TE) Security According to KARP Design Guide," draft-wei-karp-rsvp-te-analysis-00.txt, ZTE Corporation, Southeast University, Internet Engineering Task Force (IEFT), Standard Working Draft, Internet Society (ISOC) 4, Rue Des F, Jul. 27, 2011, pp. 1-8, XP015077504.

Office Action for European Application No. 20722759.6, dated Apr. 11, 2024, 5 Pages.

* cited by examiner

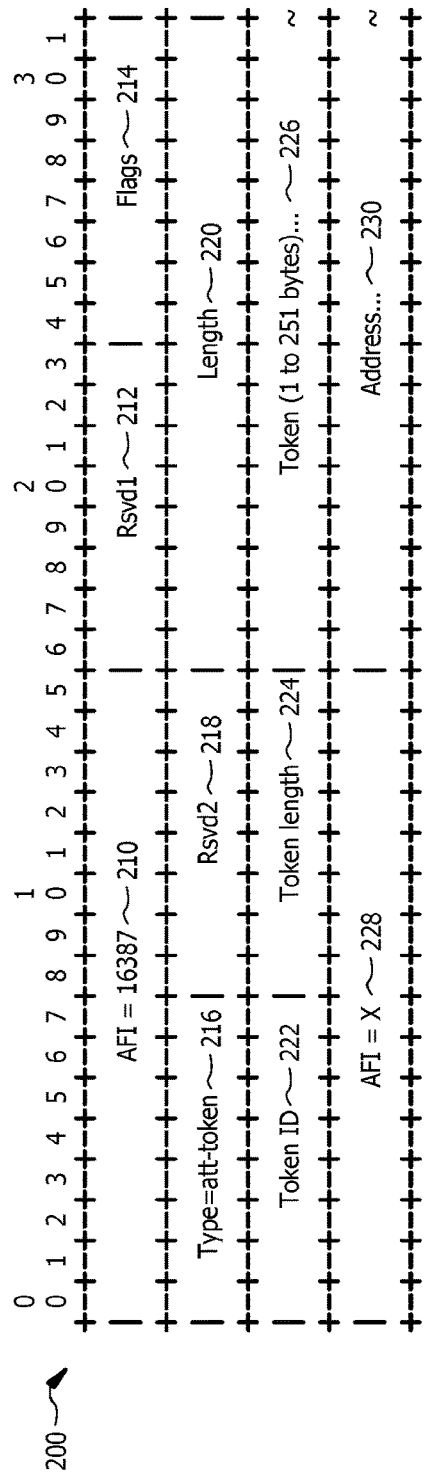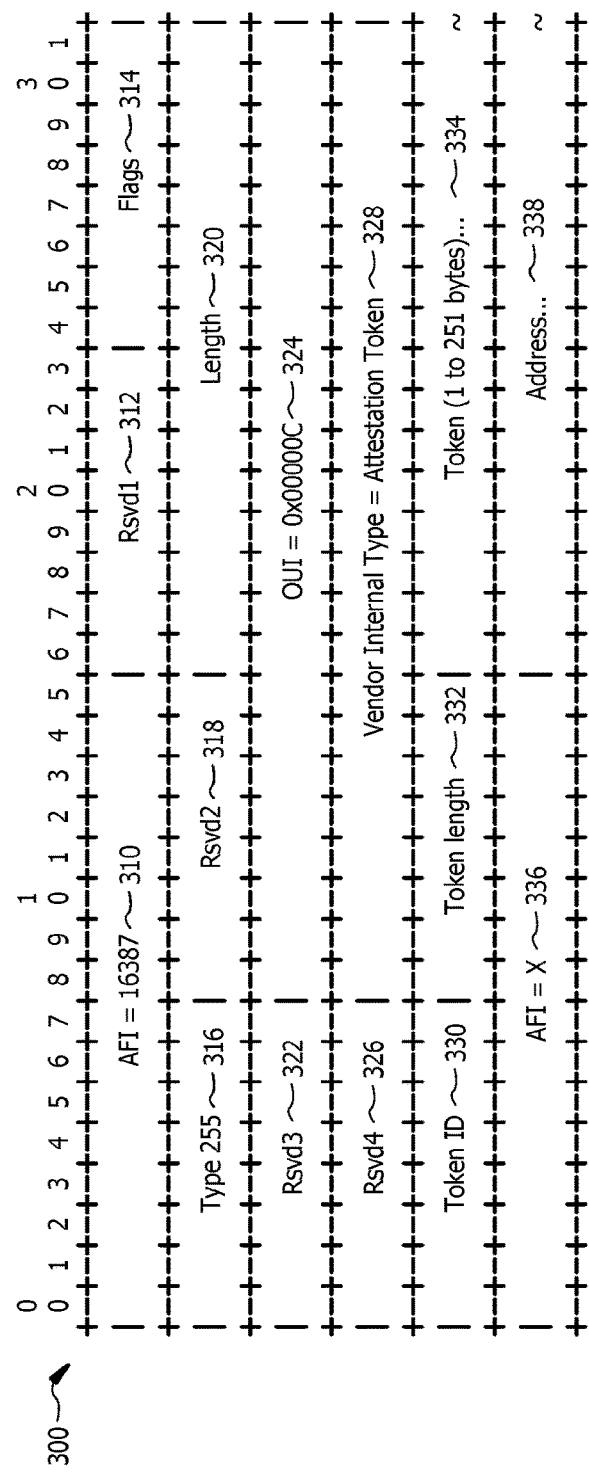

SYSTEMS AND METHODS FOR APPLYING ATTESTATION TOKENS TO LISP MESSAGES

CROSS-REFERENCE TO RELATED APPLICATIONS

This application claims benefit of U.S. Provisional Patent Application No. 62/829,568 filed Apr. 4, 2019 by Clarence Filsfils, and entitled "Applying Attestation Tokens to Locator ID Separation Protocol (LISP) Control-Plane and Data-Plane Messages," which is incorporated herein by reference as if reproduced in its entirety.

TECHNICAL FIELD

This disclosure generally relates to applying tokens to messages, and more specifically to systems and methods for applying attestation tokens to Locator/ID Separation Protocol (LISP) messages.

BACKGROUND

In a network, sensitive information may be transmitted through one or more network nodes before arriving at its destination. Certain network nodes may be become compromised. For example, an attacker may gain control of a node and direct traffic from the node to the hacker's computing device. In the event the attacker gains access to one or more network nodes, the attacker may tamper with the sensitive information transmitted through the compromised node.

BRIEF DESCRIPTION OF THE DRAWINGS

FIG. 2 illustrates a LISP canonical address format (LCAF) that may be used to distribute attestation tokens, in accordance with certain embodiments;

FIG. 3 illustrates a vendor specific LCAF that may be used to distribute attestation tokens, in accordance with certain embodiments;

DESCRIPTION OF EXAMPLE EMBODIMENTS

Overview

Figure 1:
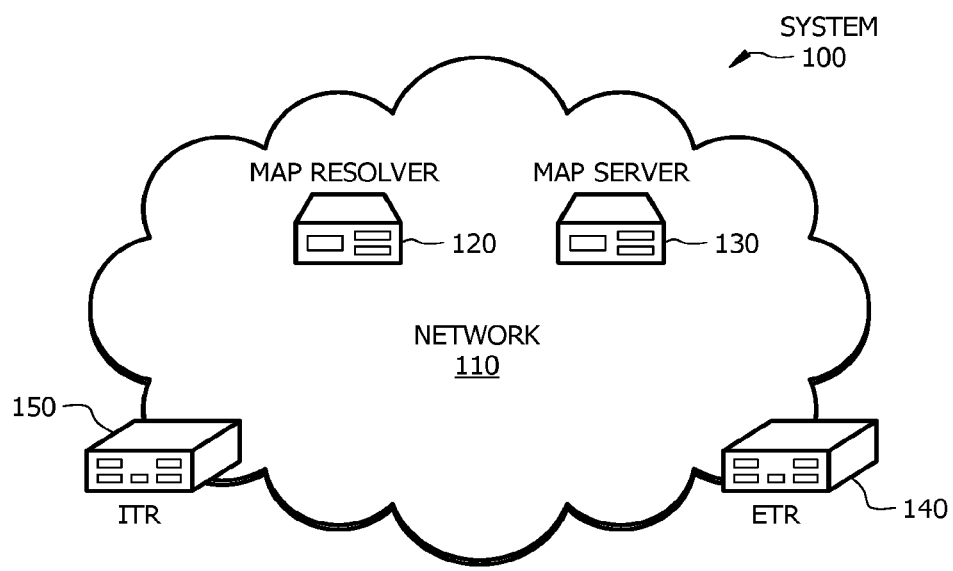
FIG. 1 illustrates a LISP architecture that may use one or more of the message formats described in FIGS. 2 through 7 below, in accordance with certain embodiments.

According to an embodiment, an apparatus of a Locator/ID Separation Protocol (LISP) environment includes one or more processors and computer-readable non-transitory storage media coupled to the one or more processors. The computer-readable non-transitory storage media include instructions that, when executed by the one or more processors, cause the one or more processors to perform operations including receiving an attestation token from a first component of the LISP environment. The operations also include encoding the attestation token using a LISP message format. The operations further include distributing the encoded attestation token with a LISP signaling message to a third component of the LISP environment.

According to another embodiment, an apparatus of a LISP environment includes one or more processors and computer-readable non-transitory storage media coupled to the one or more processors. The computer-readable non-transitory storage media include instructions that, when executed by the one or more processors, cause the one or more processors to perform operations including receiving a security level from a first component of the LISP environment. The operations also include encoding the security level using a LISP message format. The operations further include distributing the encoded security level with a LISP signaling message to a third component of the LISP environment.

According to yet another embodiment, a method includes receiving, by a first component of a LISP environment, an attestation token from a first component of the LISP environment. The method also includes encoding the attestation token using a LISP message format. The method further includes distributing the encoded attestation token with a LISP signaling message to a second component of the LISP environment.

Technical advantages of this disclosure may include one or more of the following. LISP procedures may be enhanced with the use of attestation tokens to build trust in a unidirectional fashion among components within a LISP environment (e.g., a map server, a map resolver, an egress tunnel router (ETR), an ingress tunnel router (ITR), etc.) Attestation tokens allow a map server of a LISP environment to associate a security level to the originators of map registrations, which may lead to the rejection of one or more map registrations. LISP messages generated by ETRs within the LISP environment due to network convergence events may include attestation tokens (e.g., canary stamps), which allow ITRs within the LISP environment that receive the network convergence messages to determine which network convergence policy to implement (e.g., drop mapping, refresh mapping, no action, redirect traffic to a trusted router, etc.) When the map server uses unidirectional attestation tokens, the ETR may determine the trustworthiness of the unsolicited push of mapping information. A map server may use security levels to disclose the level of trust that the map server assigns to a specific mapping pushed to the ETR. Unidirectional attestation may provide the ETR the ability to determine the trustworthiness of the ITR that is probing a particular routing locator (RLOC) of the ETR and/or that is requesting mapping information directly to the ETR. When an ITR subscribes with a map server to receive publications on mapping updates, the ITR may use attestation tokens (e.g., canary stamps) so that the map server can implement trust based policies to determine the treatment that the ITR is going to provide to the subscription request (e.g., accept, deny, rate-limit, and the like.)

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

LISP control-plane procedures may use mechanisms like LISP-Security to provide attestation of certain information or LISP-Crypto to enable the establishment of a shared secret using a complete challenge/response handshake between network components. When using LISP-Security, a LISP Map-Reply may be generated as a response to a specific Map-Request to ensure that the Map-Reply has not been modified while in transit. However, the components that are involved in the mapping resolution may have limited ability or no ability to determine a level of trust for the rest of components that are involved in the process. In LISP-crypto, ITR 150 and ETR 140 may require a full handshake with challenge/response mechanisms before establishing trust and a security channel.

Certain embodiments of this disclosure use LISP procedures to distribute and leverage attestation tokens for uni-directional attestation. Attestation tokens are signatures in the form of a group of bytes. Attestation tokens are generated after applying a hash algorithm over data that requires attestation. Attestation tokens may be generated with pre-shared key information that allows a verifier to verify the attestation token. In certain embodiments, an attestation token is a canary stamp. Canary stamps include information that allow a receiver (e.g., a verifier) to assess whether the sending components may have been tampered with or modified in an unexpected manner. The receiver may use this information to determine whether the component that sent the information can be trusted. Attestation tokens may be generated by any router that is configured to run a control protocol and exchange routing information with other components of a network.

Certain embodiments of this disclosure extend LISP procedures to account for a level of trust (i.e., a security level) when taking decisions on how to process information. The security level represents a trust/security score that a component (e.g., a router) that is relaying information associates to the information itself and/or to a component that generated the information. The security level allows network administrators to establish policies that restrict communications based on security level thresholds. An attestation token may associate a trustworthiness level to a component that depends on the time taken to complete the attestation process of the component. For example, a time-based security level may be assigned to time-dependent information received from a particular component.

Figure 4:
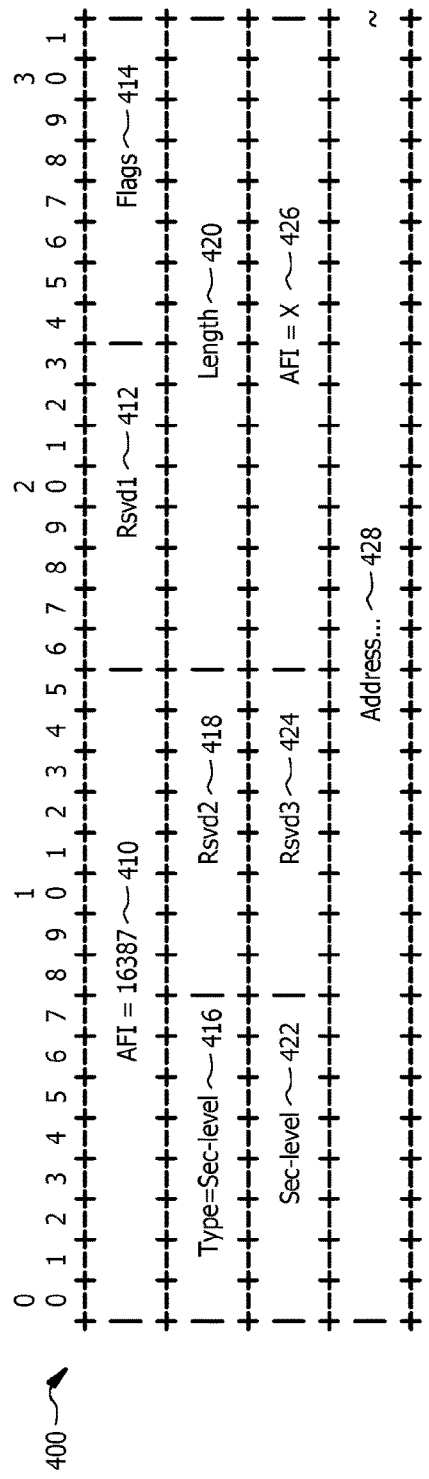
FIG. 4 illustrates an LCAF that may be used to distribute security levels, in accordance with certain embodiments.
Figure 5:
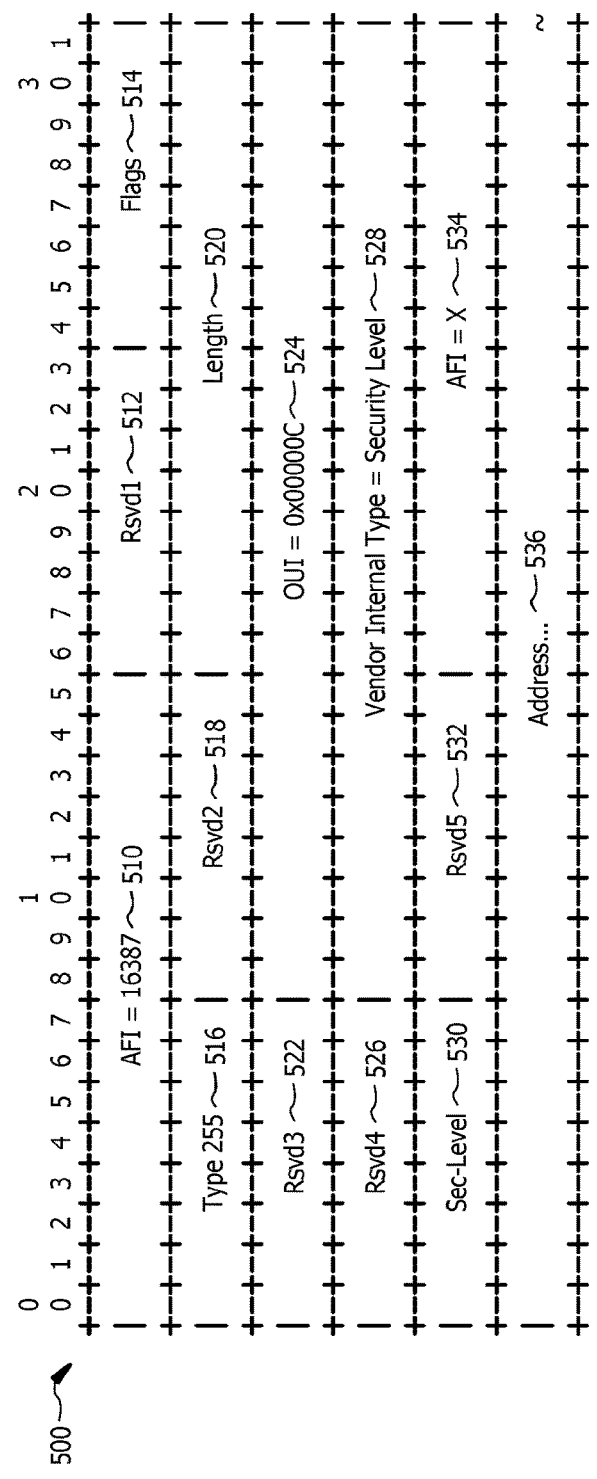
FIG. 5 illustrates a vendor specific LCAF that may be used to distribute security levels, in accordance with certain embodiments.
Figure 6:
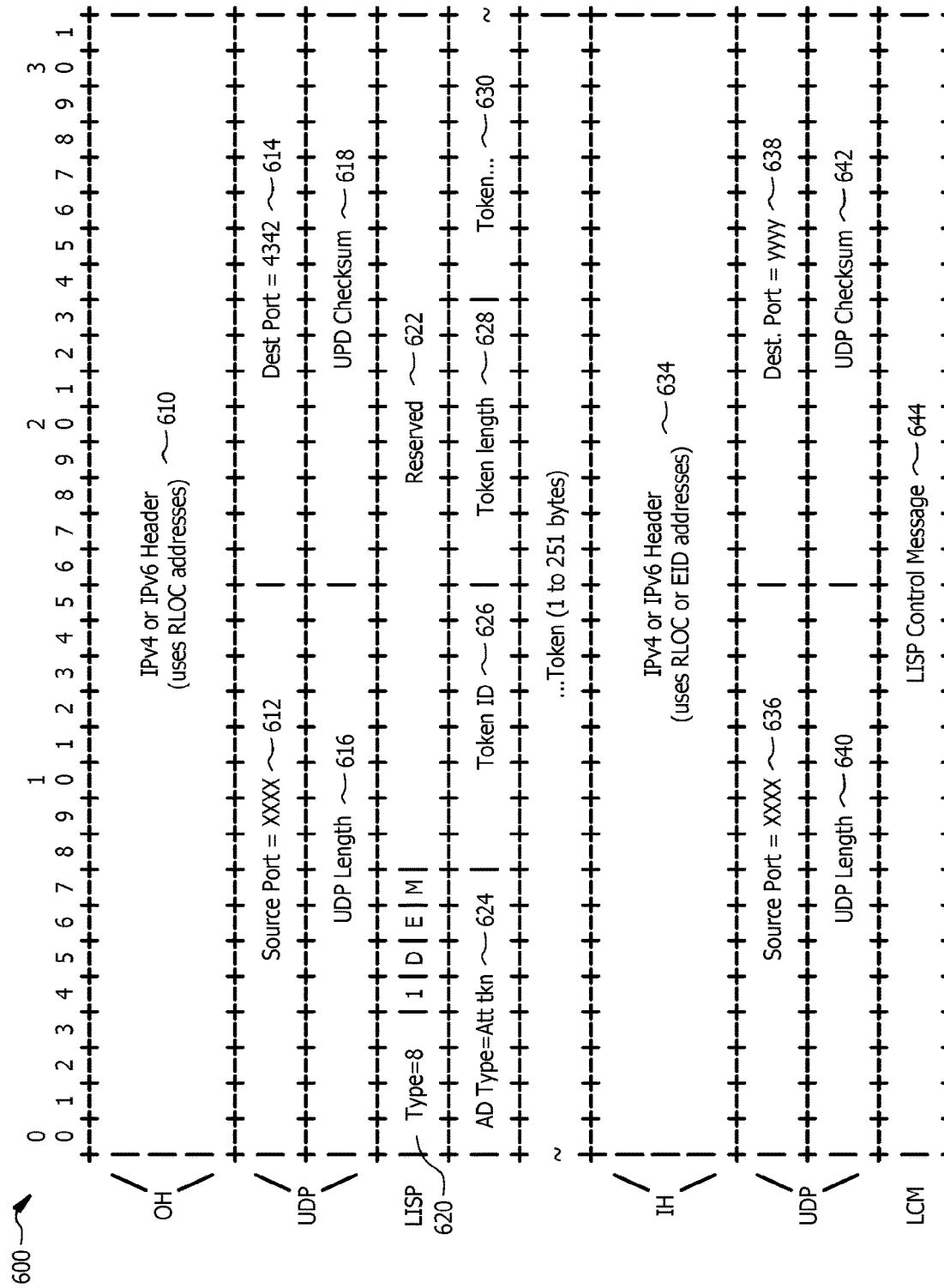
FIG. 6 illustrates a LISP Encapsulated Control Message (ECM) that may be used to distribute attestation tokens, in accordance with certain embodiments.
Figure 7:
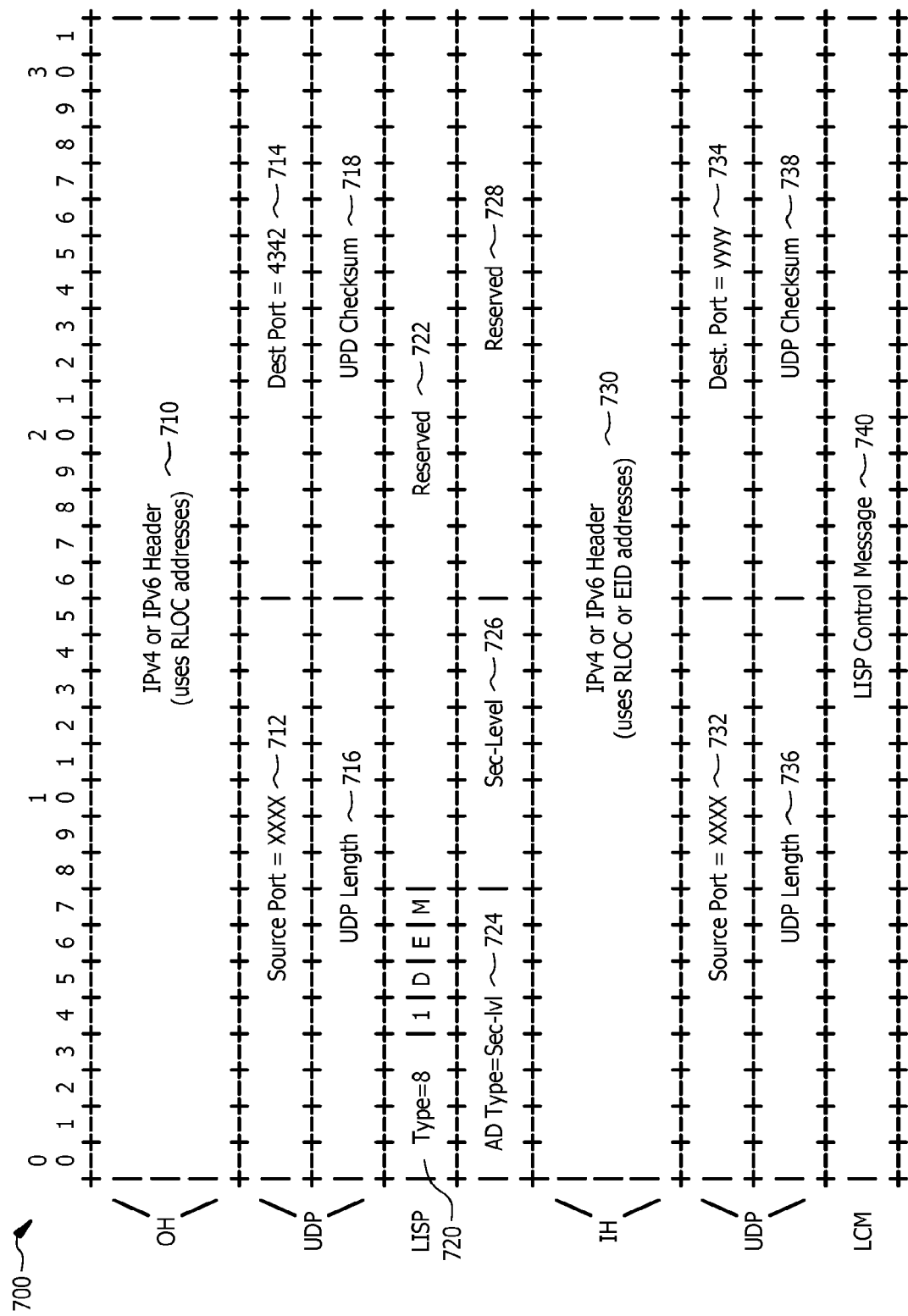
FIG. 7 illustrates a LISP ECM that may be used to distribute security levels, in accordance with certain embodiments.
Figure 8:
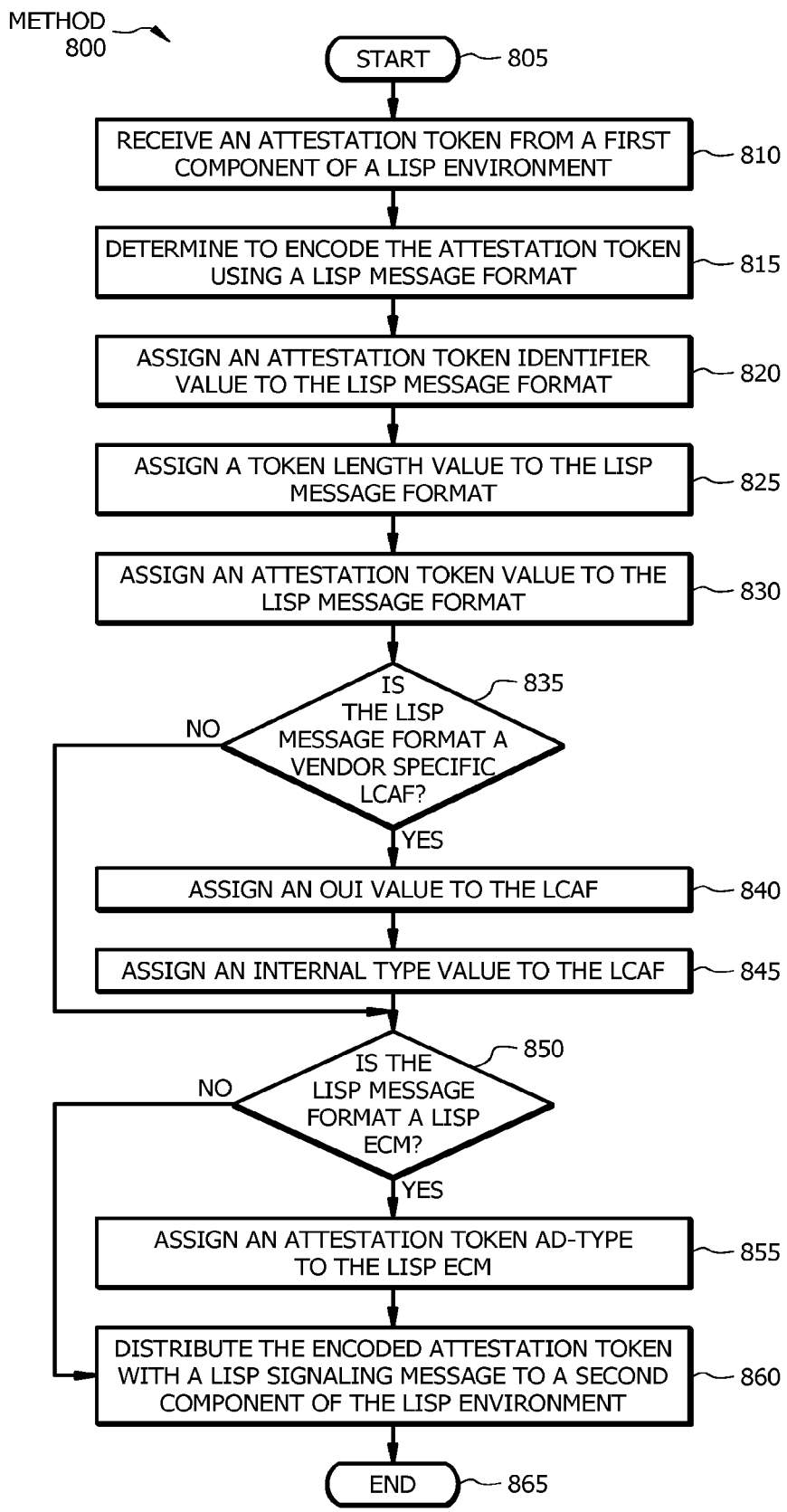
FIG. 8 illustrates a method for distributing an attestation token using a LISP message format, in accordance with certain embodiments.
Figure 9:
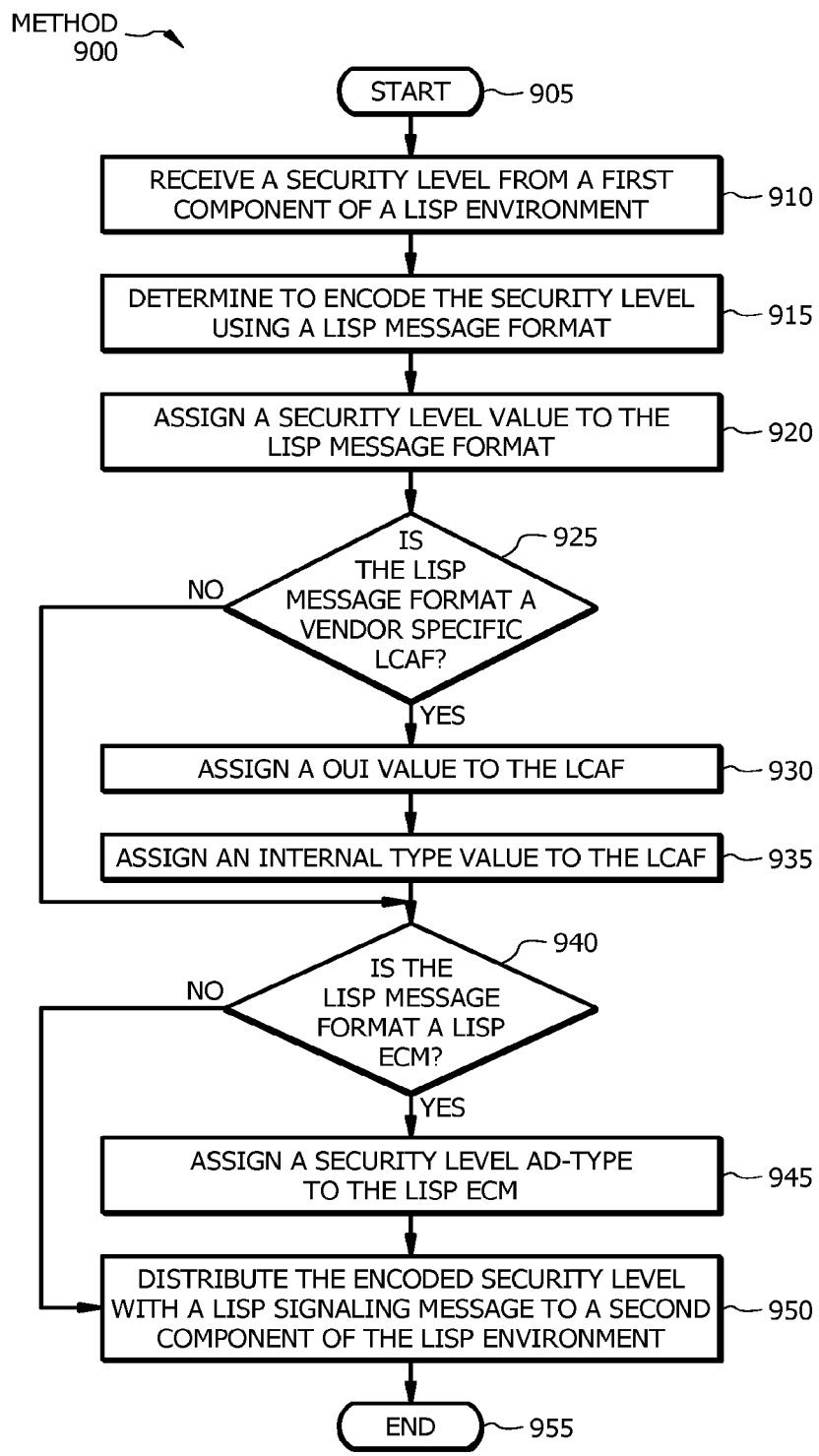
FIG. 9 illustrates a method for distributing a security level using a LISP message format, in accordance with certain embodiments.
Figure 10:
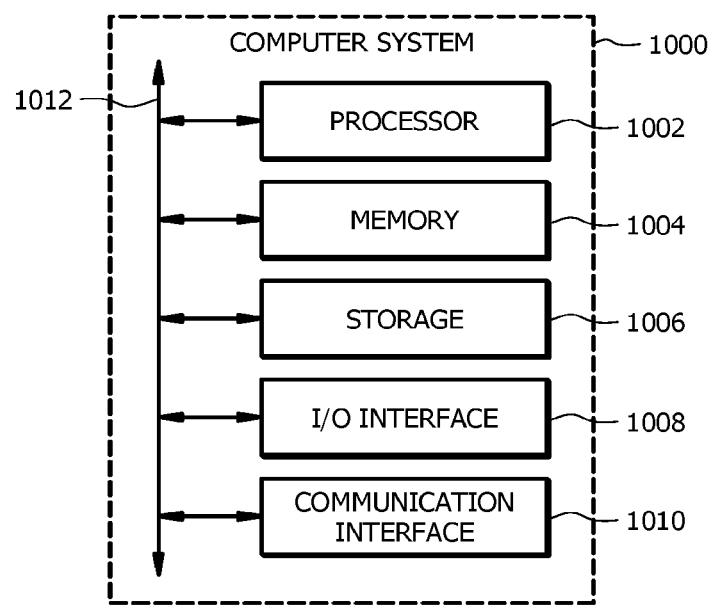
FIG. 10 illustrates a computer system, in accordance with certain embodiments.

FIG. 1 shows an example LISP architecture that may use one or more of the message formats described in FIGS. 2 through 7 below. FIG. 2 shows an example LISP canonical address format (LCAF) that may be used to distribute attestation tokens, and FIG. 3 shows an example vendor specific LCAF that may be used to distribute attestation tokens. FIG. 4 shows an example LCAF that may be used to distribute security levels, and FIG. 5 shows an example vendor specific LCAF that may be used to distribute security levels. FIG. 6 shows an example LISP ECM that may be used to distribute attestation tokens, and FIG. 7 shows an example LISP ECM that may be used to distribute security levels. FIG. 8 shows an example method for distributing an attestation token using a LISP message format. FIG. 9 shows an example method for distributing a security level using a LISP message format. FIG. 10 shows an example computer system.

FIG. 1 illustrates an example system 100 that includes LISP-specific network infrastructure components. In particular embodiments, one or more components of system 100 may apply an attestation token and/or a security level to a LISP signaling message using one or more of the message formats described in FIGS. 2 through 7 below. System 100 or portions thereof may be associated with an entity, which may include any entity, such as a business or company (e.g., a service provider) that applies attestation tokens and/or security levels to LISP signaling messages. The components of system 100 may include any suitable combination of hardware, firmware, and software. For example, the components of system 100 may use one or more elements of the computer system of FIG. 10.

System 100 of FIG. 1 includes a network 110, a map resolver 120, a map server 130, an ETR 140, and an ITR 150. Network 110 of system 100 is any type of network that facilitates communication between components of system 100. Network 110 may connect map resolver 120, map server 130, ETR 140, and/or ITR 150 of system 100. One or more portions of network 110 may include LISP-specific network infrastructure components (e.g., map resolver 120, map server 130, ETR 140, and ITR 150, etc.) Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an internet service provider (ISP) network, and the like.

Map resolver 120 of system 100 is a LISP-specific network infrastructure component that accepts Map-Requests from a LISP component of system 100 (e.g., ITR 150) and resolves the endpoint identifier (EID)-to-RLOC mapping using a mapping database. For example, map resolver 120 may accept encapsulated Map-Request messages from one or more ITRs 150, decapsulate the encapsulated Map-Request messages, and forward the Map-Request messages to map server 130 responsible for ETRs 140 that are authoritative for requested EIDs. When map resolver 120 is implemented concurrently with map server 130 in a private mapping system deployment, concurrent map server 130 forwards the encapsulated Map-Request messages to authoritative ETRs 140.

Map server 130 of system 100 is a LISP-specific network infrastructure component that learns authoritative EID-to-RLOC mappings from a LISP component of system 100 (e.g., ETR 140) and publishes the mappings in a database. For example, map server 130 may implement part of the distributed LISP mapping database by accepting registration requests from its client ETRs 140, aggregating the successfully registered EID prefixes of those EIRs 140, and advertising the aggregated prefixes into the alternative logical topology (ALT) with border gateway protocol (BGP).

ETR 140 is a LISP-specific network infrastructure component that connects a site to a LISP-capable part of a core network (e.g., the Internet). In certain embodiments, ETR 140 publishes EID-to-RLOC mappings for the site, responds to Map-Request messages, decapsulates and delivers LISP-encapsulated user data to end systems at the site, and the like. ETR 140 may send periodic Map-Register messages to one or more configured map servers 130. ETR 140 may verify that a received Map-Request message matches an EID for which it is authoritative, construct an appropriate Map-Reply message containing its configured mapping information, and send this message to ITR 150 whose RLOCs are listed in the Map-Request message. ETR 140 that receives a LISP-encapsulated packet that is directed to one of its RLOCs may decapsulate the packet, verify that the inner header is destined for an EID-numbered end system at its site, and forward the packet to the end system using site-internal routing.

ITR 150 is a LISP-specific network infrastructure component that locates EID-to-RLOC mappings for traffic destined for LISP-capable sites. When ITR 150 receives a packet destined for an EID, ITR 150 may search for the EID in its mapping cache. If ITR 150 discovers a match, ITR 150 may encapsulate the packet inside a LISP header and then route the packet normally. If no entry is found in the mapping cache of ITR 150, ITR 150 may send a Map-Request message to one of its configured map resolvers 120 and then discard the original packet. When ITR 150 receives a response to its Map-Request message, ITR 150 creates a new mapping cache entry with the contents of the Map-Reply message. When another packet, such as a retransmission for the original and, now, discarded packet arrives, the new mapping cache entry is used for encapsulation and forwarding.

Attestation tokens may be applied to LISP control-plane messages that are distributed to components (e.g., map resolver 120, map server 130, ETR 140, ITR 150, etc.) of the LISP environment of system 100. System 100 may use attestation tokens to assess the trustworthiness of one or more LISP components of system 100 (e.g., map resolver 120, map server 130, ETR 140, and/or ITR 150.) Depending on the level of trust (i.e., security level) of one or more of the components of system 100, one or more components of system 100 may implement one or more trust-level policies. The trust-level policies may include dropping a request for map-resolution, proxy-replying the resolution, forwarding the request for map-resolution to an authoritative ETR 140, and the like.

In particular embodiments, the attestation tokens may allow map server 130 to associate a level of trust to originators of map registrations. Map server 130 may accept or reject the registration based on the associated level of trust. In particular embodiments, LISP messages generated by ETRs 140 due to network convergence events may be canary stamped such that ITRs 150 receiving the network convergence messages may determine which network convergence policy to implement. The network convergence policies may include dropping a mapping, refreshing a mapping, taking no action, redirecting traffic to a trusted component of system 100, etc.

In particular embodiments, when map server 130 uses unidirectional attestation tokens, ETR 140 may determine a trustworthiness of an unsolicited push of mapping information. Map server 130 may use security levels to disclose the level of trust given to a specific mapping pushed to ETR 140.

In particular embodiments, unidirectional attestation may allow ETR 140 to determine the trustworthiness of ITR 150 that is probing a particular RLOC of ETR 140 and/or that is requesting mapping information directly to ETR 140. In particular embodiments, when ITR 150 subscribes with map server 130 to receive publications on mapping updates, system 100 may use attestation tokens (e.g., canary stamps) such that map server 130 may implement trust-based policies to determine the treatment that map server 130 extends to the subscription request. The treatment may include accepting the subscription request, denying the subscription request, rate-limiting the subscription request, and the like.

In situations where LISP procedures are structured on top of a direct handshake between interested parties, the handshake may include a challenge/response trust mechanism. The use of unidirectional attestation tokens may enhance the challenge/response trust mechanism. For example, the use of unidirectional attestation tokens may establish trust between ETR 140 and map server 130 during map registration when map registration is be used for challenge/response. As another example, the use of unidirectional attestation tokens may establish trust between ITR 150 and ETR 140 when using direct map-request/reply messages. As still another example, the use of unidirectional attestation tokens may establish trust between ITR 150 and map server 130 during a subscription process.

In certain embodiments, attestation tokens may be used to attest LISP components (e.g., map resolver 120, map server 130, ETR 140, ITR 150, etc.) involved in a signaling process and/or specific information contained in LISP messages (e.g., EIDs, RLOCs, an entire mapping, etc.) Attestation tokens may be used to allow LISP to enhance security levels in control-plane messages. For example, an attestation token may be used as part of a mapping record (e.g., EID or RLOC) by encoding the attestation token using an LCAF, as described in FIGS. 2 and 3 below. As another example, an attestation token may be used as part of an ECM, as described in FIG. 6 below.

One or more components of system 100 may encode and distribute an attestation token and/or security level when exchanging information with other components of system 100. For example, ETR 140 may add an attestation token associated to a map registration to map server 130. As another example, map server 130 may add an attestation token when sending a Map-Reply to ITR 150. As still another example, ITR 150 may add an attestation token when sending a Map Request to map resolver 120.

Although system 100 of FIG. 1 illustrates a particular arrangement of network 110, map resolver 120, map server 130, ETR 140, and ITR 150, this disclosure contemplates any suitable arrangement of network 110, map resolver 120, map server 130, ETR 140, and ITR 150. Two or more of map resolver 120, map server 130, ETR 140, and ITR 150 may be connected to each other directly, bypassing network 110. Two or more of map resolver 120, map server 130, ETR 140, and ITR 150 may be physically or logically co-located with each other in whole or in part.

Although system 100 FIG. 1 illustrates a particular number of networks 110, map resolvers 120, map servers 130, ETRs 140, and ITRs 150, this disclosure contemplates any suitable number of networks 110, map resolvers 120, map servers 130, ETRs 140, and ITRs 150. For example, network 110 may include multiple ITRs and multiple ETRs. Although system 100 of FIG. 1 illustrates particular LISP components, this disclosure contemplates any suitable LISP component. For example, system 100 may include an alternative logical topology (ALT) device, a LISP proxy ETR, a LISP proxy ITR, and the like.

FIG. 2 illustrates an example LCAF 200 that may be used to distribute attestation tokens with LISP signaling messages. LCAF 200 may be used as an individual attribute in a mapping or be concatenated (e.g., in an LCAF list) when attesting multiple elements in a signaling path (e.g., a map-resolution process). LCAF 200 is a syntax that includes a first Address Family Identifier (AFI) field 210, a first reserve field 212, a flag field 214, a type field 216, a second reserve field 218, a length field 220, a token identifier field 222, a token length field 224, a token field 226, a second AFI field 228, and an address field 230.

First AFI field 210 of LCAF 200, represented as "AFI" in the illustrated embodiment of FIG. 2, is a field (e.g., a 16-bit field) that describes an address encoding in a packet. In the illustrated embodiment of FIG. 2, the AFI value is set to 16387, which represents the AFI value assigned by an Internet Assigned Numbers Authority (IANA) to the LISP architecture and protocols. Reserve field 212 of LCAF 200, represented as "Rsvd1" in the illustrated embodiment of FIG. 2, is a field (e.g., an 8-bit field) that is reserved for future use. Flag field 214, represented as "Flags" in the illustrated embodiment of FIG. 2, is a field (e.g., an 8-bit field) reserved for future use.

Type field 216 of LCAF 200 is a field (e.g., an 8-bit field) used to identify a type of token. The value of type field 216 may be an allocated IANA type value. Type field 216 is represented as "Type=Att-token" in the illustrated embodiment of FIG. 2 to identify LCAF 200 as an attestation token. Second reserve field 212 of LCAF 200, represented as "Rsvd2" in the illustrated embodiment of FIG. 2, is a field (e.g., an 8-bit field) that is reserved for future use. Length field 220 of LCAF 200, represented as "Length" in the illustrated embodiment of FIG. 2, is a field (e.g., a 16-bit field) that covers all of the LISP Canonical Address payload, starting and including the byte after length field 220. In the illustrated embodiment of FIG. 2, the value of length field 220 counts from the byte after length field 220 (i.e., the first byte in token identifier field 222) until the end of the LCAF (i.e., the last byte of address field 230.)

Token identifier field 222 of LCAF 200, represented as "Token ID" in the illustrated embodiment of FIG. 2, is a field (e.g., an 8-bit field) that identifies the attestation token. Token identifier field 222 has a value between 0 and 254, with 255 being a reserved number. Token length field 224 of LCAF 200, represented as "Token Length" in the illustrated embodiment of FIG. 2, is a field that indicates a length of the attestation token. The length of the attestation token may be variable. In the illustrated embodiment of FIG. 2, the length of the attestation token ranges from 1 byte to 251 bytes.

Token field 226 of LCAF 200, represented as "Token (1 to 251 bytes) . . . " in the illustrated embodiment of FIG. 2, is an attestation token with a size ranging from 1 byte to 251 bytes. Second AFI field 228 of LCAF 200, represented as "AFI X" in the illustrated embodiment of FIG. 2, is a field (e.g., a 16-bit field) that may be used to structure specific data associated with the attestation token. When the attestation token is distributed without specific data, AFI field 228 is set to 0. Address field 230, represented as "Address . . . " in the illustrated embodiment of FIG. 2, is a field that may be used to structure specific data associated with the attestation token.

Modifications, additions, or omissions may be made to LCAF 200 depicted in FIG. 2. For example, LCAF 200 may include more or less than two reserve fields. As another example, the length of the attestation token may range from 1 byte to 1024 bytes. Although FIG. 2 illustrates a particular arrangement of the fields within LCAF 200, this disclosure contemplates any suitable arrangement of the fields within LCAF 200.

FIG. 3 illustrates an example vendor specific LCAF 300 that may be used to distribute attestation tokens with LISP signaling messages. Vendor specific LCAF 300 allows vendors and/or organizations to have internal encodings for LCAF addresses. Vendor specific LCAF 300 may be used when an IANA value (e.g., an allocated IANA type value of type field 216 of FIG. 1) is not available. Vendor specific LCAF 300 may be used as an individual attribute in a mapping or be concatenated (e.g., in an LCAF list) when attesting multiple elements in a signaling path (e.g. a map-resolution process). Vendor specific LCAF 300 is a syntax that includes a first AFI field 310, a first reserve field 312, a flag field 314, a type field 316, a second reserve field 318, a length field 320, a third reserve field 322, an Organizationally Unique Identifier (OUI) field 324, a fourth reserve field 326, an internal type field 328, a token identifier field 330, a token length field 332, a token field 334, a second AFI field 336, and an address field 338.

AFI field 310 of vendor specific LCAF 300, represented as "AFI" in the illustrated embodiment of FIG. 3, is a field (e.g., a 16-bit field) that describes an address encoding in a packet. In the illustrated embodiment of FIG. 3, the AFI value is set to 16387, which represents the AFI value assigned by IANA to the LISP architecture and protocols. Reserve field 312 of vendor specific LCAF 300, represented as "Rsvd1" in the illustrated embodiment of FIG. 3, is a field (e.g., an 8-bit field) that is reserved for future use. Flag field 314 of vendor specific LCAF 300, represented as "Flags" in the illustrated embodiment of FIG. 3, is a field (e.g., an 8-bit field) reserved for future flag use.

Type field 316 of vendor specific LCAF 300 is a field (e.g., an 8-bit field) used to identify a type of LCAF 300. Type field 316 is represented as "Type=255" in the illustrated embodiment of FIG. 2 to identify that LCAF 300 is a specific format. Second reserve field 318 of vendor specific LCAF 300, represented as "Rsvd2" in the illustrated embodiment of FIG. 3, is a field (e.g., an 8-bit field) that is reserved for future use. Length field 320 of vendor specific LCAF 300, represented as "Length" in the illustrated embodiment of FIG. 3, covers all of the LISP Canonical Address payload, starting and including the byte after length field 320. In the illustrated embodiment of FIG. 3, the value of length field 320 counts from the byte after length field 320 (i.e., the first byte in third reserve field 322) until the end of LCAF 300 (i.e., the last byte of address field 338.) Third reserve field 322 of vendor specific LCAF 300, represented as "Rsvd3" in the illustrated embodiment of FIG. 3, is a field (e.g., an 8-bit field) that is reserved for future use.

OUI field 324 of vendor specific LCAF 300, represented as "OUI=0x00000C" in the illustrated embodiment of FIG. 3, is a field (e.g., a 24-bit field) used to identify LCAF 300 as vendor specific. OUI field 324 may be used to prevent collisions across vendors and/or organizations using LCAF 300. The value of OUI field 324 may represent the Institute of Electrical and Electronics Engineers (IEEE) OUI of a vendor or organization (e.g., Cisco.) Fourth reserve field 326 of vendor specific LCAF 300, represented as "Rsvd4" in the illustrated embodiment of FIG. 3, is a field (e.g., an 8-bit field) that is reserved for future use. Internal type field 328 of vendor specific LCAF 300, represented as "Vendor Internal Type=Attestation Token" in the illustrated embodiment of FIG. 3, is a specific internal type value of a vendor or organization (e.g., Cisco) indicating that LCAF 300 is an attestation token. Each vendor or organization may define its own internal type to use with vendor specific LCAF 300.

Token identifier field 330 of vendor specific LCAF 300, represented as "Token ID" in the illustrated embodiment of FIG. 3, is a field (e.g., an 8-bit field) that identifies the attestation token. Token identifier field 330 has a value between 0 and 254, with 255 being a reserved number. Token length field 332 of vendor specific LCAF 300, represented as "Token Length" in the illustrated embodiment of FIG. 3, is a field that determines the length of the attestation token. The length of the attestation token may be variable. In the illustrated embodiment of FIG. 3, The length of the attestation token ranges from 1 byte to 251 bytes. Token field 334 of vendor specific LCAF 300, represented as "Token (1 to 251 bytes) . . . " in the illustrated embodiment of FIG. 3, is an attestation token with a size ranging from 1 byte to 251 bytes.

Second AFI field 336 of vendor specific LCAF 300, represented as "AFI X" in the illustrated embodiment of FIG. 3, is a field (e.g., a 16-bit field) that may be used to structure specific data associated with the attestation token. When the attestation token (e.g., canary stamp) is distributed without specific data, second AFI field 336 is set to 0. Address field 338 of vendor specific LCAF 300, represented as "Address . . . " in the illustrated embodiment of FIG. 3, is a field that may be used to structure specific data associated with the attestation token.

Modifications, additions, or omissions may be made to vendor specific LCAF 300 depicted in FIG. 3. For example, vendor specific LCAF 300 may include more or less than four reserve fields. Although FIG. 3 illustrates a particular arrangement of the fields within vendor specific LCAF 300, this disclosure contemplates any suitable arrangement of the fields within vendor specific LCAF 300.

FIG. 4 illustrates an illustrates an example LCAF 400 that may be used to distribute security levels with LISP signaling messages. The security level may allow a recipient (e.g., ETR 140 of FIG. 1) of LCAF 400 to determine the trustworthiness of a specific mapping pushed to the recipient. LCAF 400 may be used as an individual attribute in a mapping or be concatenated (e.g., in an LCAF list) when attesting multiple elements in a signaling path (e.g. a map-resolution process). LCAF 400 is a syntax that includes a first AFI field 410, a first reserve field 412, a flag field 414, a type field 416, a second reserve field 418, a length field 420, a security level field 422, a third reserve field 424, a second AFI field 426, and an address field 428.

AFI field 410 of LCAF 400, represented as "AFI" in the illustrated embodiment of FIG. 4, is a field (e.g., a 16-bit field) that describes an address encoding in a packet. In the illustrated embodiment of FIG. 4, the AFI value is set to 16387, which represents the AFI value assigned by IANA to the LISP architecture and protocols. Reserve field 412 of LCAF 400, represented as "Rsvd1" in the illustrated embodiment of FIG. 4, is a field that is reserved for future use. Flag field 414 of LCAF 400, represented as "Flags" in the illustrated embodiment of FIG. 4, is a field (e.g., an 8-bit field) reserved for future flag use.

Type field 416 of LCAF 400 is a field (e.g., an 8-bit field) used to identify a type of LCAF 400. The value of type field 416 may be an allocated IANA type value. Type field 416 is represented as "Type=Sec-level" in the illustrated embodiment of FIG. 4 to identify LCAF 400 as a security level LCAF. Second reserve field 418, represented as "Rsvd2" in the illustrated embodiment of FIG. 4, is a field (e.g., an 8-bit field) that is reserved for future use. Length field 420 of LCAF 400, represented as "Length" in the illustrated embodiment of FIG. 4, covers all of the LISP Canonical Address payload, starting and including the byte after length field 420. In the illustrated embodiment of FIG. 4, the value of length field 420 counts from the byte after length field 420 (i.e., the first byte in security level field 422) until the end of LCAF 400 (i.e., the last byte of address field 428.)

Security level field 422 of LCAF 400, represented as "Sec-Level" in the illustrated embodiment of FIG. 4, indicates the trustworthiness of the information being exchanged. Security level field 422 may have a value ranging from 1 byte to 254 bytes. Third reserve field 424 of LCAF 400, represented as "Rsvd3" in the illustrated embodiment of FIG. 4, is a field that is reserved for future use. Second AFI field 426 of LCAF 400, represented as "AFI X" in the illustrated embodiment of FIG. 4, is a field (e.g., a 16-bit field) that may be used to structure specific data associated with the security level. When the security level is distributed without specific data, AFI field 426 is set to 0. Address field 428 of LCAF 400, represented as "Address . . . " in the illustrated embodiment of FIG. 4, is a field that may be used to structure specific data associated with the security level.

Modifications, additions, or omissions may be made to LCAF 400 depicted in FIG. 4. For example, LCAF 400 may include more or less than three reserve fields. Although FIG. 4 illustrates a particular arrangement of the fields within LCAF 400, this disclosure contemplates any suitable arrangement of the fields within LCAF 400.

FIG. 5 illustrates an example vendor specific LCAF 500 that may be used to distribute security levels. Vendor specific LCAF 500 allows vendors and/or organizations to have internal encodings for LCAF addresses. Vendor specific LCAF 500 may be used when an IANA value (e.g., an allocated IANA type value of type field 416 of FIG. 4) is not available. The security level may allow a recipient (e.g., ETR 140 of FIG. 1) of vendor specific LCAF 500 to determine the trustworthiness of a specific mapping pushed to the recipient. Vendor specific LCAF 500 may be used as an individual attribute in a mapping or be concatenated (e.g., in an LCAF list) when attesting multiple elements in a signaling path (e.g. a map-resolution process). Vendor specific LCAF 500 is a syntax that includes a first AFI field 510, a first reserve field 512, a flag field 514, a type field 516, a second reserve field 518, a length field 520, a third reserve field 522, an OUI field 524, a fourth reserve field 526, an internal type field 528, a security level field 530, a fifth reserve field 532, a second AFI field 534, and an address field 536.

AFI field 510 of vendor specific LCAF 500, represented as "AFI" in the illustrated embodiment of FIG. 5, is a field (e.g., a 16-bit field) used to describe an address encoding in a packet. In the illustrated embodiment of FIG. 5, the AFI value is set to 16387, which represents the AFI value assigned by IANA to the LISP architecture and protocols. First reserve field 512 of vendor specific LCAF 500, represented as "Rsvd1" in the illustrated embodiment of FIG. 5, is a field that is reserved for future use. Flag field 514 of vendor specific LCAF 500, represented as "Flags" in the illustrated embodiment of FIG. 5, is a field (e.g., an 8-bit field) reserved for future flag use.

Type field 516 of vendor specific LCAF 500 is a field (e.g., an 8-bit field) used to identify the type of LCAF 500. Type field 516 is represented as "Type=255" in the illustrated embodiment of FIG. 5 to identify that LCAF 500 is a specific format. Second reserve field 518 of vendor specific LCAF 500, represented as "Rsvd2" in the illustrated embodiment of FIG. 5, is a field that is reserved for future use. Length field 520 of vendor specific LCAF 500, represented as "Length" in the illustrated embodiment of FIG. 5, covers all of the LISP Canonical Address payload, starting and including the byte after length field 50. In the illustrated embodiment of FIG. 5, the value of length field 520 counts from the byte after length field 520 (i.e., the first byte in third reserve field 522) until the end of LCAF 500 (i.e., the last byte of address field 536.) Length field 520 is a 16-bit field in FIG. 5. Third reserve field 522 of vendor specific LCAF 500, represented as "Rsvd3" in the illustrated embodiment of FIG. 5, is a field that is reserved for future use.

OUI field 524 of vendor specific LCAF 500, represented as "OUI=0x00000C" in the illustrated embodiment of FIG. 5, is a field (e.g., a 24-bit field) used to identify LCAF 500 as vendor specific. OUI field 524 may be used to prevent collisions across vendors and/or organizations using LCAF 500. OUI field 524 carries the IEEE OUI of organization (e.g., Cisco.) Fourth reserve field 526 of vendor specific LCAF 500, represented as "Rsvd4" in the illustrated embodiment of FIG. 5, is a field (e.g., an 8-bit field) that is reserved for future use. Internal type field 528 of vendor specific LCAF 500, represented as "Vendor Internal Type =Security Level" in the illustrated embodiment of FIG. 5, is a specific internal type value of a vendor or organization (e.g., Cisco) indicating that LCAF 500 is a security level LCAF. Each vendor or organization may define its own internal type to use with vendor specific LCAF 500.

Security level field 530 of vendor specific LCAF 500, represented as "Sec-Level" in the illustrated embodiment of FIG. 5, indicates the trustworthiness of the information being exchanged. Security level field 530 may have a value ranging from 1 byte to 254 bytes. Fifth reserve field 532 of LCAF 500, represented as "Rsvd5" in the illustrated embodiment of FIG. 5, is a field (e.g., an 8-bit field) that is reserved for future use. Second AFI field 534 of vendor specific LCAF 500, represented as "AFI X" in the illustrated embodiment of FIG. 5, is a field (e.g., a 16-bit field) that may be used to structure specific data associated with the security level. When the security level is distributed without specific data, second AFI field 534 is set to 0. Address field 536 of vendor specific LCAF 500, represented as "Address . . . " in the illustrated embodiment of FIG. 5, is a field that may be used to structure specific data associated with the security level.

Modifications, additions, or omissions may be made to vendor specific LCAF 500 depicted in FIG. 5. For example, vendor specific LCAF 500 may include more or less than three reserve fields. Although FIG. 5 illustrates a particular arrangement of the fields within vendor specific LCAF 500, this disclosure contemplates any suitable arrangement of the fields within vendor specific LCAF 500.

FIG. 6 illustrates an example LISP ECM 600 that may be used to distribute attestation tokens with LISP control plane messages. LISP control plane messages may use LISP ECM 600 to append attestation data together with information that is being distributed. Attestation tokens may be included as an Authentication Data (AD) type to ECM signaling to allow unidirectional attestation. ECM 600 is a syntax that includes a first header field 610, a first source port field 612, a first destination port field 614, a first User Datagram Protocol (UDP) length field 616, a first UDP checksum field 618, a type field 620, a reserve field 622, an AD type field 624, a token identifier field 626, a token length field 628, a token field 630, a second header field 634, a second source port field 636, a second destination port field 638, a second UDP length field 640, a second UDP checksum field 642, and a LISP control message field 644.

First header field 610 of LISP ECM 600, represented as "IPv4 or IPv6 Header (uses RLOC addresses)" in the illustrated embodiment of FIG. 6, is a field used to indicate an Internet Protocol version 4 (IPv4) or an Internet Protocol version 6 (IPv6) address. The IPv4 or IPv6 address may be an RLOC address of an ETR (e.g., ETR 140 of FIG. 1). Source port field 612 of LISP ECM 600, represented as "Source Port=xxxx" in the illustrated embodiment of FIG. 6, is a field (e.g., a 16-bit field) with a value representing a next-available number assigned by a host machine. Destination port field 614 of LISP ECM 600, represented as "Dest Port=4342" in the illustrated embodiment of FIG. 6, is a field (e.g., a 16-bit field) that identifies how a message is to be forwarded when the message arrives at a server. Destination port 4342 indicates that LISP ECM 600 is a LISP control packet that is to be transported using UDP port 4342.

UDP length field 616 of LISP ECM 600, represented as "UDP Length" in the illustrated embodiment of FIG. 6, is a field (e.g., a 16-bit field) indicating the length of the UDP header and data. UDP checksum 618 of LISP ECM 600, represented as "UDP Checksum" in the illustrated embodiment of FIG. 6, is a field (e.g., a 16-bit field) that indicates a 16-bit one's complement of the one's complement sum of a pseudo header of information. Type 620 of LISP ECM 600, represented as "Type 8" in the illustrated embodiment of FIG. 6, is the type of message. Value 8 indicates that ECM 600 is an encapsulated control message.

The value "1" following "Type 8" in LISP ECM 600 represents a security bit. When the security bit is set to 1, the filed following Reserve field 622 has a particular authentication data format. The value "D" following the "1" value represents a delegated database tree (DDT)-bit. When the DDT-bit is set to 1, the sender is requesting a map-referral message to be returned. The value "E" following the "1" value represents a to-ETR bit. When the to-ETR bit is set to 1, the map server (e.g., map server 130 of FIG. 1) has the intention to forward the ECM to an authoritative ETR. The value "M" following the "E" value represents a to-map server (MS) bit. When the to-MS bit is set to 1, a map request is being sent to a co-located map resolver (e.g., map resolver 120 of FIG. 1) and map server where the message can be processed directly by the map server. Reserve field 622 of LISP ECM 600, represented as "Reserved" in the illustrated embodiment of FIG. 6, is a field that is reserved for future use.

AD type field 624 of LISP ECM 600, represented as "AD Type=Att-tkn" in the illustrated embodiment of FIG. 6, is a field that indicates the appropriate attestation token value. Token identifier field 626 of LISP ECM 600, represented as "Token ID" in the illustrated embodiment of FIG. 6, is a field (e.g., an 8-bit field) that identifies the attestation token. Token identifier field 626 is a value between 0 and 254, with 255 being a reserved number. Token length field 628 of LISP ECM 600, represented as "Token Length" in the illustrated embodiment of FIG. 6, is a field (e.g., an 8-bit field) that determines the length of the attestation token. The length of the attestation token may be variable. In the illustrated embodiment of FIG. 6, the length ranges from 1 byte to 251 bytes. Token field 630 of LISP ECM 600, represented as "Token (1 to 251 bytes) . . . " in the illustrated embodiment of FIG. 6, is an attestation token with a size ranging from 1 byte to 251 bytes.

Second header field 634 of LISP ECM 600, represented as "IPv4 or IPv6 Header (uses RLOC addresses)" in the illustrated embodiment of FIG. 6, is a field used to indicate an IPv4 or an IPv6 address. The IPv4 or IPv6 address may be a RLOC address of an ETR (e.g., ETR 140 of FIG. 1).

Second source port field 636 of LISP ECM 600, represented as "Source Port xxxx" in the illustrated embodiment of FIG. 6, is a value that represents a next-available number assigned by a host machine. Destination port field 638 of LISP ECM 600, represented as "Destination Port yyyy" in the illustrated embodiment of FIG. 6, is a value that identifies how a message is to be forwarded when the message arrives at a server. Second UDP length field 640 of LISP ECM 600, represented as "UDP Length" in the illustrated embodiment of FIG. 6, is a field (e.g., a 16-bit field) indicating the length of the UDP header and data. Second UDP checksum 642 of LISP ECM 600, represented as "UDP Checksum" in the illustrated embodiment of FIG. 6, is a field (e.g., a 16-bit field) that indicates a 16-bit one's complement of the one's complement sum of a pseudo header of information. LISP control message field 644 of LISP ECM 600, represented as "LISP Control Message" in the illustrated embodiment of FIG. 6, is a field indicating that LISP ECM 600 is used with a LISP control message.

Modifications, additions, or omissions may be made to LISP ECM 600 depicted in FIG. 6. For example, LISP ECM 600 may include more or less than three reserve fields. Although FIG. 6 illustrates a particular arrangement of the fields within LISP ECM 600, this disclosure contemplates any suitable arrangement of the fields within LISP ECM 600.

FIG. 7 illustrates an example LISP ECM 700 that may be used to distribute security levels. LISP control plane messages may use LISP ECM 700 to append security level data together with information that is being distributed. Security levels may be included as an AD type to ECM signaling to associate a trust level to the data. LISP ECM 700 is a syntax that includes a first header field 710, a first source port field 712, a first destination port field 714, a first UDP length field 716, a first UDP checksum field 718, a type field 720, a first reserve field 722, an AD type field 724, a security level field 726, a second reserved field 728, a second header field 730, a second source port field 732, a second destination port field 734, a second UDP length field 736, a second UDP checksum field 738, and a LISP control message field 740.

First header field 710, represented as "IPv4 or IPv6 Header (uses RLOC addresses)" in the illustrated embodiment of FIG. 7, is a field used to indicate an Internet Protocol version 4 (IPv4) or an Internet Protocol version 6 (IPv6) address. The IPv4 or IPv6 address may be an RLOC address of an ETR (e.g., ETR 140 of FIG. 1). Source port field 712, represented as "Source Port=xxxx" in the illustrated embodiment of FIG. 7, is a value that represents a next-available number assigned by a host machine. Destination port field 714, represented as "Destination Port=4342" in the illustrated embodiment of FIG. 7, is a value that identifies how a message is to be forwarded when the message arrives at a server. Destination port 4342 indicates that ECM 600 is a LISP control packet that is to be transported using UDP port 4342.

UDP length field 716, represented as "UDP Length" in the illustrated embodiment of FIG. 7, is the length of the UDP header and data. UDP checksum 718, represented as "UDP Checksum" in the illustrated embodiment of FIG. 7, is a field (e.g., a 16-bit field) that indicates a 16-bit one's complement of the one's complement sum of a pseudo header of information. Type 720, represented as "Type 8" in the illustrated embodiment of FIG. 7, is the type of message. Value 8 indicates that ECM 700 is an encapsulated control message. Reserve field 722, represented as "Reserved" in the illustrated embodiment of FIG. 7, is a field that is reserved for future use. AD type field 724, represented as "AD Type=Sec-lv1" in the illustrated embodiment of FIG. 7, is a field that indicates a security level. Security level field 726, represented as "Sec-Level" in the illustrated embodiment of FIG. 7, determines the trustworthiness of information being exchanged. The security level field may have a value ranging from 1 byte to 254 bytes. Reserve field 728, represented as "Reserved" in the illustrated embodiment of FIG. 7, is a field that is reserved for future use.

Second header field 730, represented as "IPv4 or IPv6 Header (uses RLOC addresses)" in the illustrated embodiment of FIG. 7, is a field used to indicate an IPv4 or an IPv6 address. The IPv4 or IPv6 address may be an RLOC address of an ETR (e.g., ETR 140 of FIG. 1). Second source port field 732, represented as "Source Port xxxx" in the illustrated embodiment of FIG. 7, is a value that represents a next-available number assigned by a host machine. Destination port field 734, represented as "Destination Port yyyy" in the illustrated embodiment of FIG. 7, is a value that identifies how a message is to be forwarded when the message arrives at a server. Second UDP length field 736, represented as "UDP Length" in the illustrated embodiment of FIG. 6, is the length of the UDP header and data. Second UDP checksum 738, represented as "UDP Checksum" in the illustrated embodiment of FIG. 7, is a field (e.g., a 16-bit field) that indicates a 16-bit one's complement of the one's complement sum of a pseudo header of information. LISP control message field 740, represented as "LISP Control Message" in the illustrated embodiment of FIG. 7, is a field indicating that LISP ECM 700 is used with a LISP control message.

Modifications, additions, or omissions may be made to LISP ECM 700 depicted in FIG. 7. For example, LISP ECM 700 may include more or less than three reserve fields. Although FIG. 7 illustrates a particular arrangement of the fields within LISP ECM 700, this disclosure contemplates any suitable arrangement of the fields within LISP ECM 700.

One or more message formats illustrated in FIGS. 2 through 7 above may be used by one or more components of system 100 of FIG. 1 to apply an attestation token and/or a security level to a LISP signaling message. For example, map server 130 of FIG. 1 may receive an attestation token from ETR 140, encode the attestation token using LCAF 200 of FIG. 2, vendor specific LCAF 300 of FIG. 3, or LISP ECM 600 of FIG. 6, and distribute the encoded attestation token with the LISP signaling message to ITR 150. As another example, map server 130 of FIG. 1 may receive a security level from ETR 140, encode the security level using LCAF 400 of FIG. 4, vendor specific LCAF 500 of FIG. 5, or LISP ECM 700 of FIG. 7, and distribute the encoded security level with the LISP signaling message to ITR 150.

FIG. 8 illustrates an example method 800 for distributing an attestation token using a LISP message format. Method 800 begins at step 805. At step 810, an apparatus (e.g., map resolver 120, map server 130, ETR 140, or ITR 150 of FIG. 1) of a LISP environment receives an attestation token from a first component (e.g., map resolver 120, map server 130, ETR 140, or ITR 150 of FIG. 1) of the LISP environment. The attestation token may be generated by any router that is configured to run a control protocol and exchange routing information with other components of a network. The attestation token, which is a signature in the form of a group of bytes, is generated after applying a hash algorithm over data that requires attestation. Method 800 then moves from step 810 to step 815.

At step 815, the apparatus determines to encode the attestation token using a LISP message format. The LISP message format may be an LCAF (e.g., LCAF 200 of FIG. 2), a vendor specific LCAF (e.g., LCAF 300 of FIG. 3), or a LISP ECM (e.g., LISP ECM 600 of FIG. 6.) Method 800 then moves from step 815 to step 820, where the apparatus assigns an attestation token identifier value to a first field (e.g., token identifier field 222 of FIG. 2) of the LISP message format. The attestation token identifier value identifies the attestation token and has a value between 0 and 254. Method 800 then moves from step 820 to step 825, where the apparatus assigns a token length value to a second field (e.g., token length field 224 of FIG. 2) of the LISP message format. The token length value indicates a length of the attestation token. Method 800 then moves from step 825 to step 830, where the apparatus assigns an attestation token value to a third field (e.g., token field 226 of FIG. 2) of the LISP message format. The attestation token value indicates a value of the attestation token ranging from 1 byte to 251 bytes. Method 800 then moves from step 830 to step 835.

At step 835, the apparatus determines whether the LISP message format is a vendor specific LCAF (e.g., vendor specific LCAF 300 of FIG. 3). If the LISP message format is not a vendor specific LCAF, method 800 advances from step 835 to step 850. If the LISP message format is a vendor specific LCAF, method 800 moves from step 835 to step 840, where the apparatus assigns an OUI value to a fourth field (e.g., OUI field 324 of FIG. 3) of the vendor specific LCAF. The OUI value identifies the LISP LCAF as vendor specific. Method 800 then moves from step 840 to step 845, where the apparatus assigns an internal type value to a fifth field (e.g., internal type field 328 of FIG. 3) of the vendor specific LCAF. The internal type value represents the attestation token as defined by a vendor. Method 800 then moves from step 845 to step 850.

At step 850, the apparatus determines whether the LISP message format is a LISP ECM (e.g., LISP ECM 600 of FIG. 6). If the LISP message format is not a LISP ECM, method 800 advances from step 850 to step 860, where the apparatus distributes the encoded attestation token (which is encoded using an LCAF) with a LISP signaling message to a second component (e.g., map resolver 120, map server 130, ETR 140, or ITR 150 of FIG. 1) of the LISP environment. If the LISP message format is a LISP ECM, method 800 moves from step 850 to step 855, where the apparatus assigns an attestation token AD-type to a fourth field (e.g., AD-type field 624 of FIG. 6) of the LISP ECM. Method 800 then advances from step 855 to step 860, where the apparatus distributes the encoded attestation token (which is encoded using a LISP ECM) with a LISP signaling message to the second component of the LISP environment. The encoded attestation token may be distributed to the second component of the LISP environment as an individual attribute in a mapping. In certain embodiments, the encoded attestation token may be concatenated in an LCAF list when attesting multiple components in a signaling path of the LISP environment. Method 800 then moves from step 860 to step 865, where method 800 ends.

Modifications, additions, or omissions may be made to method 800 depicted in FIG. 8. Method 800 may include more, fewer, or other steps. For example, method 800 may include assigning one or more AFI values, one or more reserve values, and/or one or more flag values to one or more fields of the LISP message format. Steps of method 800 depicted in FIG. 8 may be performed in parallel or in any suitable order. For example, one or more steps of method 800 may be reversed where suitable. While discussed as specific components completing the steps of method 800, any suitable component may perform any step of method 800.

FIG. 9 illustrates an example method 900 for distributing a security level using a LISP message format. Method 900 begins at step 905. At step 910, an apparatus (e.g., map resolver 120, map server 130, ETR 140, or ITR 150 of FIG. 1) of a LISP environment receives a security level from a first component (e.g., map resolver 120, map server 130, ETR 140, or ITR 150 of FIG. 1) of the LISP environment. Method 900 then moves from step 910 to step 915, where the apparatus determines to encode the security level using a LISP message format. The LISP message format may be an LCAF (e.g., LCAF 400 of FIG. 4), a vendor specific LCAF (e.g., LCAF 500 of FIG. 5), or a LISP ECM (e.g., LISP ECM 700 of FIG. 7.) Method 900 then moves to step 915 to step 920.

At step 920, the apparatus assigns a security level value to a first field (e.g., security level field 422 of FIG. 4) of the LISP message format. The security level value indicates a level of trustworthiness of the information being exchanged and has a value ranging from 1 to 254. Method 900 then moves from step 920 to step 925, where the apparatus determines whether the LISP message format is a vendor specific LCAF (e.g., vendor specific LCAF 500 of FIG. 5). If the LISP message format is not a vendor specific LCAF, method 900 advances from step 925 to step 940. If the LISP message format is a vendor specific LCAF, method 900 moves from step 925 to step 930, where the apparatus assigns an OUI value to a second field (e.g., OUI field 524 of FIG. 5) of the vendor specific LCAF. The OUI value identifies the LISP LCAF as vendor specific. Method 900 then moves from step 9305 to step 935, where the apparatus assigns an internal type value to a third field (e.g., internal type field 528 of FIG. 5) of the vendor specific LCAF. The internal type value represents the security level as defined by a vendor. Method 900 then moves from step 935 to step 940.

At step 940, the apparatus determines whether the LISP message format is a LISP ECM (e.g., LISP ECM 700 of FIG. 7). If the LISP message format is not a LISP ECM, method 900 advances from step 940 to step 950, where the apparatus distributes the encoded security level (which is encoded using an LCAF) with a LISP signaling message to a second component (e.g., map resolver 120, map server 130, ETR 140, or ITR 150 of FIG. 1) of the LISP environment. If the LISP message format is a LISP ECM, method 900 moves from step 940 to step 945, where the apparatus assigns a security level AD-type to a third field (e.g., AD-type field 724 of FIG. 7) of the LISP ECM. Method 900 then moves from step 945 to step 950, where the apparatus distributes the encoded security level (which is encoded using a LISP ECM) with a LISP signaling message to the second component of the LISP environment. The encoded security level may be distributed to the second component of the LISP environment as an individual attribute in a mapping. In certain embodiments, the encoded security level may be concatenated in an LCAF list when attesting multiple components in a signaling path of the LISP environment. Method 900 then moves from step 950 to step 955, where method 900 ends.

Modifications, additions, or omissions may be made to method 900 depicted in FIG. 9. Method 900 may include more, fewer, or other steps. For example, method 900 may include assigning one or more AFI values, one or more reserve values, and/or one or more flag values to one or more fields of the LISP message format. Steps of method 900 depicted in FIG. 9 may be performed in parallel or in any suitable order. For example, one or more steps of method 900 may be reversed where suitable. While discussed as specific components completing the steps of method 900, any suitable component may perform any step of method 900.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless MC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both that couples components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
one or more processors; and
one or more computer-readable non-transitory storage media coupled to the one or more processors and comprising instructions operable when executed by the one or more processors to cause the one or more processors to perform operations comprising:
receiving a security level from a first component of a Locator/ID Separation Protocol (LISP) environment, wherein the security level determines a trustworthiness of information exchanged within the LISP environment;
encoding the security level using a LISP message format, wherein encoding the security level using the LISP message format comprises assigning a security level value to a first field of the LISP message format; and
distributing the security level with a LISP signaling message to a second component of the LISP environment.

2. The apparatus of claim 1, wherein the security level value ranges from 1 and 254.

3. The apparatus of claim 1, wherein the LISP message format is a LISP canonical address format (LCAF).

4. The apparatus of claim 1, wherein:
the LISP message format is a vendor specific LCAF; and
encoding the security level using the LISP message format comprises:

assigning an Organizationally unique Identifier (OUI) to a first field of the vendor specific LCAF, wherein the OUI identifies the LISP LCAF as vendor specific; and
assigning an internal type to a second field of the vendor specific LCAF, wherein the internal type represents the security level as defined by a vendor.

5. The apparatus of claim 1, wherein:
the LISP message format is a LISP Encapsulated Control Message (ECM); and
encoding the security level using the LISP message format comprises assigning an Authentication Data (AD) type to a first field of the LISP ECM.

6. The apparatus of claim 1, wherein the LISP message format is distributed to the second component of the LISP environment as an individual attribute in a mapping.

7. The apparatus of claim 1, the operations further comprising:
assigning an Address Family Identifier (AFI) value to a fourth field of the LISP message format; and
assigning an address value to a fifth field of the LISP message format;
wherein the AFI value and the address value are used to distribute data associated with the security level.

8. A method, comprising:
receiving a security level from a first component of a Locator/ID Separation Protocol (LISP) environment, wherein the security level determines a trustworthiness of information exchanged within the LISP environment;
encoding the security level using a LISP message format, wherein encoding the security level using the LISP message format comprises assigning a security level value to a first field of the LISP message format; and
distributing the security level with a LISP signaling message to a second component of the LISP environment.

9. The method of claim 8, wherein the security level value ranges from 1 and 254.

10. The method of claim 8, wherein the LISP message format is a LISP canonical address format (LCAF).

11. The method of claim 8, wherein:
the LISP message format is a vendor specific LCAF; and
encoding the security level using the LISP message format comprises:
assigning an Organizationally unique Identifier (OUI) to a first field of the vendor specific LCAF, wherein the OUI identifies the LISP LCAF as vendor specific; and
assigning an internal type to a second field of the vendor specific LCAF, wherein the internal type represents the security level as defined by a vendor.

12. The method of claim 8, wherein:
the LISP message format is a LISP Encapsulated Control Message (ECM); and
encoding the security level using the LISP message format comprises assigning an Authentication Data (AD) type to a first field of the LISP ECM.

13. The method of claim 8, wherein the LISP message format is distributed to the second component of the LISP environment as an individual attribute in a mapping.

14. The method of claim 8, further comprising:
assigning an Address Family Identifier (AFI) value to a fourth field of the LISP message format; and
assigning an address value to a fifth field of the LISP message format;

wherein the AFI value and the address value are used to distribute data associated with the security level.

15. One or more computer-readable non-transitory storage media embodying instructions that, when executed by a processor, cause the processor to perform operations comprising:

receiving a security level from a first component of a Locator/ID Separation Protocol (LISP) environment, wherein the security level determines a trustworthiness of information exchanged within the LISP environment;

encoding the security level using a LISP message format, wherein encoding the security level using the LISP message format comprises assigning a security level value to a first field of the LISP message format; and distributing the security level with a LISP signaling message to a second component of the LISP environment.

16. The one or more computer-readable non-transitory storage media of claim 15, wherein the security level value ranges from 1 and 254.

17. The one or more computer-readable non-transitory storage media of claim 15, wherein the LISP message format is a LISP canonical address format (LCAF).

18. The one or more computer-readable non-transitory storage media of claim 15, wherein:

the LISP message format is a vendor specific LCAF; and encoding the security level using the LISP message format comprises:

assigning an Organizationally unique Identifier (OUI) to a first field of the vendor specific LCAF, wherein the OUI identifies the LISP LCAF as vendor specific; and assigning an internal type to a second field of the vendor specific LCAF, wherein the internal type represents the security level as defined by a vendor.

19. The one or more computer-readable non-transitory storage media of claim 15, wherein:

the LISP message format is a LISP Encapsulated Control Message (ECM); and encoding the security level using the LISP message format comprises assigning an Authentication Data (AD) type to a first field of the LISP ECM.

20. The one or more computer-readable non-transitory storage media of claim 15, wherein the LISP message format is distributed to the second component of the LISP environment as an individual attribute in a mapping.

* * * * *